US012241279B2

(12) United States Patent
Kumar Mukundala

(10) Patent No.: US 12,241,279 B2
(45) Date of Patent: Mar. 4, 2025

(54) SYSTEMS AND METHODS FOR CONTROL OF A LOCKING SYSTEM

(71) Applicant: Carrier Corporation, Palm Beach Gardens, FL (US)

(72) Inventor: Sumanth Kumar Mukundala, Hyderabad (IN)

(73) Assignee: Carrier Corporation, Palm Beach Gardens, FL (US)

( * ) Notice: Subject to any disclaimer, the term of this patent is extended or adjusted under 35 U.S.C. 154(b) by 140 days.

(21) Appl. No.: 17/664,456

(22) Filed: May 23, 2022

(65) Prior Publication Data

US 2022/0403677 A1 Dec. 22, 2022

Related U.S. Application Data

(60) Provisional application No. 63/202,651, filed on Jun. 18, 2021.

(51) Int. Cl.

*E05B 43/00* (2006.01)
*E05B 47/06* (2006.01)
*E05B 47/00* (2006.01)

(52) U.S. Cl.

CPC ............ *E05B 43/005* (2013.01); *E05B 47/06* (2013.01); *E05B 2047/0056* (2013.01)

(58) Field of Classification Search

CPC . E05B 43/005; E05B 47/06; E05B 2047/0056
See application file for complete search history.

(56) References Cited

U.S. PATENT DOCUMENTS 4,272,921 A * 6/1981 Jorgensen ............... E05F 15/73 49/31
4,534,131 A * 8/1985 Blackston ............... E05F 15/73 109/8
4,720,128 A * 1/1988 Logan, Jr. ............. E05B 65/108 292/251.5
4,763,937 A * 8/1988 Sittnick, Jr. ........... E05B 65/108 361/170

(Continued)

FOREIGN PATENT DOCUMENTS

DE 202005000938 U1 5/2005
EP 3060734 B1 2/2021

(Continued)

*Primary Examiner* — Mark A Williams
(74) *Attorney, Agent, or Firm* — Seager, Tufte & Wickhem, LLP

(57) ABSTRACT

Systems and methods for control of a locking system are disclosed. In some embodiments, a system comprises one or more sensors configured to generate output signals indicating one or more movement information of a subject. The system comprises at least one processor operatively connected with the one or more sensors, and memory storing instructions executable by the at least one processor, the instructions when executed cause the system to determine, using the output signals from the one or more sensors, one or more movement parameters of the subject; and send, based on the determined movement parameters of the subject, an instruction to the locking system to adjust an open delay time for the locking system, the open delay time being time the locking system remains open.

17 Claims, 5 Drawing Sheets

(56) References Cited

U.S. PATENT DOCUMENTS

| | | | | | |
|---|---|---|---|---|---|
| 4,893,852 | A * | 1/1990 | Harris | E05B 65/108 250/342 |
| 5,184,855 | A * | 2/1993 | Waltz | E05C 19/168 292/341.16 |
| 5,479,151 | A * | 12/1995 | Lavelle | E05B 65/108 340/545.7 |
| 6,486,793 | B1 * | 11/2002 | Buccola | E05C 19/166 70/279.1 |
| 8,820,803 | B2 * | 9/2014 | Hunt | E05B 65/108 292/DIG. 65 |
| 8,875,441 | B2 * | 11/2014 | Agam | G01S 7/527 49/28 |
| 9,779,567 | B1 | 10/2017 | Shen | |
| 2011/0018680 | A1 * | 1/2011 | Lai | E05C 19/166 340/3.1 |
| 2012/0167644 | A1 * | 7/2012 | Berger | E05B 45/06 70/144 |
| 2014/0001779 | A1 * | 1/2014 | Bedoian | E05B 47/00 292/336.3 |

FOREIGN PATENT DOCUMENTS

| | | | |
|---|---|---|---|
| GB | 2423117 | B | 12/2007 |
| WO | 2001086097 | A2 | 11/2001 |
| WO | 2019071306 | A1 | 4/2019 |

* cited by examiner

SYSTEMS AND METHODS FOR CONTROL OF A LOCKING SYSTEM

CROSS REFERENCE TO A RELATED APPLICATION

The application claims the benefit of U.S. Provisional Application No. 63/202,651 filed Jun. 18, 2021, the contents of which are hereby incorporated in their entirety.

BACKGROUND

The invention relates generally to locking systems and, more specifically, to control of locking systems.

Generally, an open delay time for a lock (time the lock stays open after it's unlocked) is set by a system administrator (e.g., at the front desk). When an access card is encoded, the default open delay time is generally three seconds. In the case of a person with disabilities, the open delay time is generally 15 seconds by default. There may be situations where the default open delay time is not long enough to allow the person to reach the door. In these situations, the person generally needs to re-open the lock or contact the system administrator to change the open delay time which requires updating the lock with the latest locking planning and re-encoding the guest keycard.

BRIEF DESCRIPTION

Aspects of the disclosure relate to methods, apparatuses, and/or systems for control of locking systems.

In some embodiments, a system for control of a locking system comprises one or more sensors configured to generate output signals indicating one or more movement information of a subject. The system further comprises at least one processor operatively connected with the one or more sensors, and memory storing instructions executable by the at least one processor. The instructions when executed cause the system to determine, using the output signals from the one or more sensors, one or more movement parameters of the subject; and send, based on the determined movement parameters of the subject, an instruction to the locking system to adjust an open delay time for the locking system, the open delay time being time the locking system remains open.

In some embodiments, the one or more movement parameters comprise speed of the subject.

In some embodiments, the instructions cause the system to determine a condition of the subject based on the one or more movement parameters reaching a condition threshold; and send the instruction to the locking system based on the condition of the subject.

In some embodiments, the one or more sensors comprise an optical sensor. In some embodiments, the instructions when executed cause the system to determine a gait of the subject based on the output signals of the optical sensor; and send the instruction to the locking system based on the determined gait.

In some embodiments, the optical sensor is configured to send the instruction to the locking system.

In some embodiments, the optical sensor is configured to communicate with the locking system using one or more short-range repeaters.

In some embodiments, the locking system may control access to a controlled space. The instructions when executed may cause the system to send a subsequent instruction to the locking system, subsequent to the subject accessing the controlled space, to adjust the open delay time back to an original open delay time.

In some embodiments, the locking system may control access to a controlled space, and the adjusted open delay time for the locking system may be applied to additional subjects having access to the controlled space.

In some embodiments, the locking system may control access to a controlled space, and additional subjects may have access to the controlled space. The instructions when executed may cause the system to: determine, using the output signals from the one or more sensors, one or more movement parameters of the additional subjects; and send the instruction to the locking system to adjust the open delay time for the locking system based on the determined movement parameters of a slowest of the subject and the additional subjects.

In some embodiments, a method for control of a locking system is implemented in a system comprising one or more sensors, at least one processor and memory storing instructions. The method comprises: generating output signals indicating one or more movement information of a subject; and sending, based on the determined movement parameters of the subject, an instruction to the locking system to adjust an open delay time for the locking system, the open delay time being time the locking system remains open.

In some embodiments, a non-transitory computer-readable storage medium storing program instructions is provided. The program instructions are computer-executable to implement: determining, using output signals from one or more sensors, one or more movement information of the subject; and sending, based on the determined movement parameters of the subject, an instruction to a locking system to adjust an open delay time for the locking system, the open delay time being time the locking system remains open.

In some embodiments, the program instructions are computer-executable to implement: determining a condition of the subject based on the one or more movement parameters responsive to the one or more parameters reaching a condition threshold; and sending the instruction to the locking system based on the condition of the subject.

In some embodiments, the program instructions are computer-executable to implement: determining a gait of the subject based on output signals of an optical sensor; and sending the instruction to the locking system based on the determined gait.

In some embodiments, the program instructions are computer-executable to implement sending the instruction to the locking system using the optical sensor.

In some embodiments, the program instructions are computer-executable to implement communicating with the locking system using the optical sensor and one or more short-range repeaters.

Various other aspects, features, and advantages of the invention will be apparent through the detailed description of the invention and the drawings attached hereto. It is also to be understood that both the foregoing general description and the following detailed description are examples and not restrictive of the scope of the invention.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Figure 1:
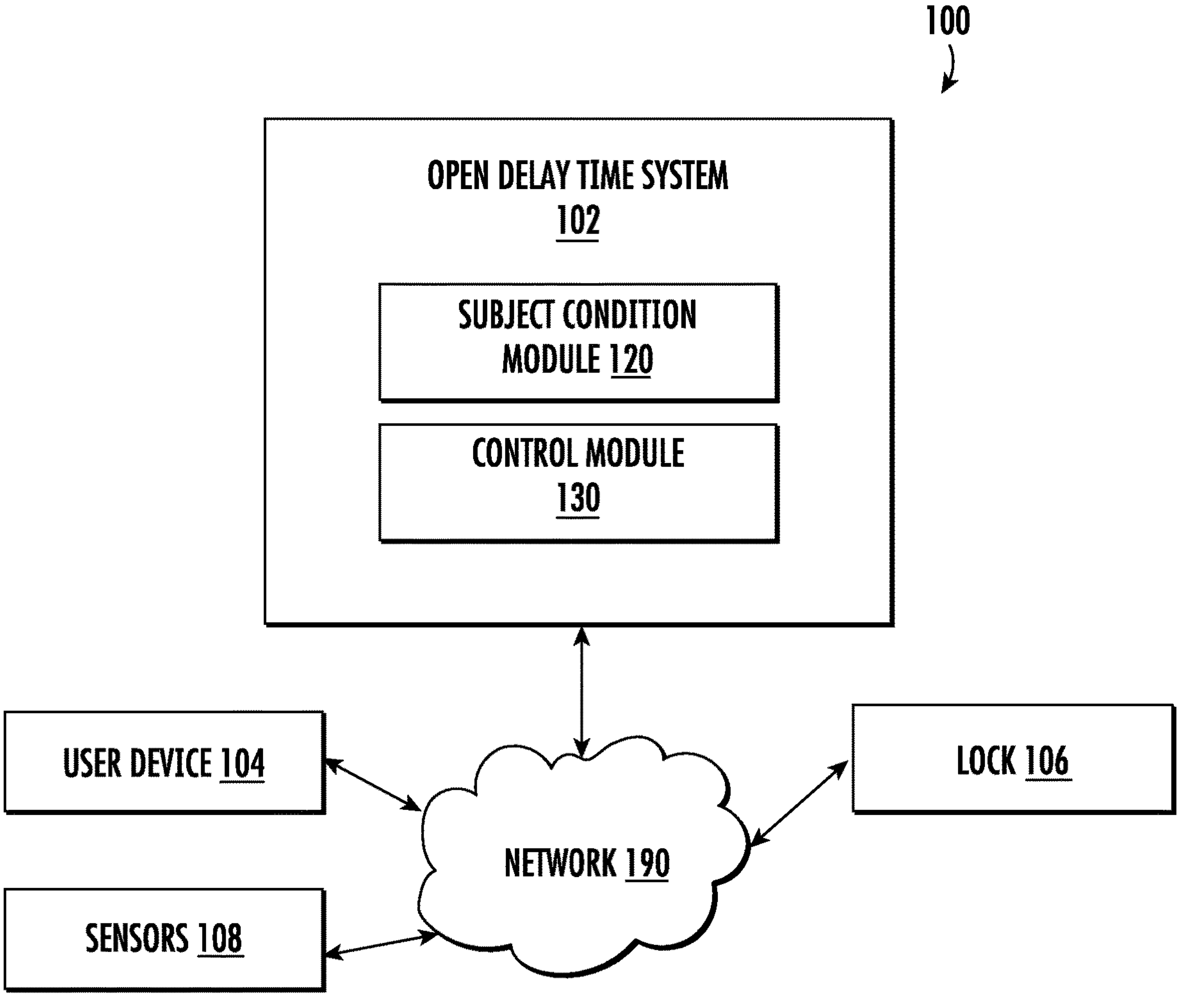
FIG. 1 shows an example of a system for control of a locking system, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

The present disclosure provides a system 100 for controlling a locking system. In particular, system 100 may be configured to adjust an open delay time of a locking system. The open delay time refers to the time a locking system will stay open after it's unlocked (before it locks again). For example, in some cases, if the lock open delay time is set to 10 seconds, when unlocked (when a keycard is presented/inserted over, or by user device) the lock opens for 10 seconds and the guest may turn the lock handle, go inside the room and closes the door, but the lock will still be in an open state until 10 seconds have passed. In other cases, the open delay time may be configured such that if option "Close on Lever" is selected at front desk, as soon the door is closed or lock handle lever is released, the lock will be closed and doesn't wait for the open delay time.

In some embodiments, system 100 may be configured to adjust the amount of time a locking system may stay open to allow the subject to gain access to the locked area (e.g., room) in a comfortable manner and without having to unlock the locking system again or having to contact the system administrator or go to the front desk to change the open delay time. This may be beneficial for example, in cases where the person is slow, disable, impaired, sick, etc. In some embodiments, system 100 may adjust the amount of time the locking system stays open based on a condition of the subject. System 100 may determine the subject's condition based on information related to the subject's speed (or gait, balance, coordination, or other movement information) obtained from one or more sensors and may send an instruction to the locking system to increase or decrease the open delay time based on the condition of the subject.

In some embodiments, one or more operations of system 100 may be accomplished by a user device that is configured for communication and authentication with the locking system (e.g., a mobile device, a wearable computing device, a tablet, etc.) For example, communication between the user device and the locking system may be authorized once the guest has access to the room; in the case of cancellation or expiration of the reservation, communication between the user device and the locking system is no longer possible.

In some embodiments, one or more operations of system 100 may be accomplished by one or more sensors (e.g., optical sensors) configured for communication with the locking system. In some embodiments, operations of system 100 may provide a practical access control solutions that allows for dynamic adjustments to the open delay time without requiring additional hardware or processing capabilities at the locking system since some or all the operations may be processed by processors of the user device or the one or more sensors. In some embodiments, direct communication technologies may be used for communication between the user device, the locking system, and/or the sensors and may provide for a secure interaction between the parties as devices should be proximate to each other to establish a communication link. For example, in some embodiments, communications between the user device, the locking system, and/or the sensors may be accomplished through Bluetooth low energy (BLE/BTLE) or other short-range communication protocols which may allow for low energy and cost-effective operations. That said, not all embodiments necessarily provide all of these benefits, and some embodiments may provide other distinct advantages, which is not to suggest that any other feature described herein may not also be omitted in some embodiments.

FIG. 1 shows an example of a system 100 for controlling a locking system, in accordance with one or more embodiments. System 100 may include open delay time system 102, a user device 104, a locking system 106, sensors 108, and/or other components. Other components known to one of ordinary skill in the art may be included in system 100 to gather, process, transmit, receive, acquire, and provide information used in conjunction with the disclosed embodiments. In addition, system 100 may further include other components that perform or assist in the performance of one or more processes that are consistent with disclosed embodiments.

Locking system 106 refers to any locking mechanism that is capable of fastening and/or controlling access (e.g., to a controlled asset or controlled area). Locking system 106 may include mechanical and electrical components. Additionally, locking system 106 may be configured to receive signals from and transfer signals to one or more components of system 100. Although locking system 106 is depicted in FIG. 1 as a single device, in some embodiments, locking system 106 may include a plurality of interconnected devices capable of performing the functions discussed herein. In some embodiments, locking system 106 may be configured to request and/or verify digital certificate information, decrypt/encrypt information, and or other types of information processing operations. In some embodiments, locking system 106 may include computing resources such as processors and memory devices for storing instructions (e.g., computing system 500 described herein below with reference to FIG. 5). The processors may be configured to execute software instructions to perform various operations consistent with one or more embodiments of the present disclosure.

Sensors 108 may be configured to generate output signals conveying information related to one or more movement parameters of the subject. In some embodiments, the one or more movement parameters may include one or more of moving speed, number of steps taken, pace, manner, and pattern of walking (e.g., gait), balance, coordination, and/or other movement related parameters. In some embodiments, sensors 180 may include one or more of an accelerometers, a location sensor, an optical sensor, a global positioning system (GPS) sensor, a position sensor, a pedometer, a motion detector, or other sensors for providing movement information. In some embodiments, Sensors 108 may be disposed in a plurality of locations within system 100. For example, sensors 108 may include sensors located in user device 104, locking system 106, with the subject (e.g., the subject is in possession of the sensor through a device or the sensor is directly coupled with the subject), in the surrounding area of the subject location (e.g., in a door, hallway, building, etc.), or in other locations.

User device 104 may include any device capable of communicating subject authentication credentials to locking system 106. In some embodiments, user device 104 may be configured to communicate with locking system 106 through short-range wireless communication technologies. For example, user device 104 may be any user device having capabilities to communicate with the locking system (e.g., mobile phone, a wearable computing device, a tablet, walker, wheelchair, stroller, white cane, etc.). In some embodiments, user device 104 may be a keycard configured to communicate subject authentication credentials to locking system 106. In some embodiments, the keycard may be a contact card (e.g., magnetic stripe card, barcode, swipe card, or a contact smart card), or a contactless card capable of communication through short-range wireless communications (e.g., RFID, NFC, BLE, Ultra-wideband (UWB), or other short-range communications technologies). In some embodiments, user device 104 may be configured to communicate with locking system 106 via Bluetooth. For example, user device 104 may communicate directly with BTLE of locking system 106; communicate with a BTLE repeater which in turn communicates with BTLE of locking system 106; communicate through a combination of BTLE and Wi-Fi; and/or other ways of communications.

Open delay time system 102, in some embodiments, may include a subject condition module 120, a control module 130, and/or other components. Open delay time system 102 may include computing resources such as processors and memory devices for storing instructions (e.g., computing system 500 described herein below with reference to FIG. 5). The processors may be configured to execute software instructions to perform various operations of system 100. The computing resources may include software instructions to perform operations of modules 120, 130, and/or other components of system 100. It should be appreciated that although components 120 and 130 are illustrated in FIG. 1 as being co-located within a single processing unit, one or more of components 120, 130, and/or other components may be located remotely from the other components. The description of the functionality provided by the different components 120, 130, and/or other components described below is for illustrative purposes, and is not intended to be limiting, as any of components 120 and 130 may provide more or less functionality than is described. For example, one or more of components 120 and 130 may be eliminated, and some or all of its functionality may be provided by other components the other components 120 or 130. As another example, one or more additional components may perform some or all of the functionality attributed below to one of components 120 or 130.

Subject condition module 120 may be configured to determine one or more movement parameters of the subject. The one or more movement parameters may be determined based on output signals from one or more sensors (e.g., sensors 108 described herein). In some embodiments, the movement parameters of the subject may include one or more of moving speed, number of steps taken, pace, manner and pattern of walking (e.g., gait), balance, coordination, and/or other movement related parameters. For example, in some embodiments, subject condition module 130 may determine the subject speed from output signals from an accelerometer (of sensors 108). In another example, subject condition module 130 may determine a gait of the subject based on output signals from an optical sensor (e.g., one or more cameras). The gait of the subject may be determined using image/video analysis techniques. In some embodiments, a movement parameter may be determined based on combination of information from multiple sensors 108 (e.g., optical sensor, location sensor, pedometer, etc.). In some embodiments, the movement parameters may be determined by the one or more sensors 108 and communicated to subject condition 120, directly to locking system 106, or to other components of system 100. It is to be noted that the examples of movement parameters and sensors described here are for illustrative purposes only, and are not intended to be limiting, as other movement parameters of the subject and sensors may be used and are consistent with the present disclosure.

In some embodiments, subject condition module 120 may be configured to determine a condition of the subject based the one or more movement parameters. In some embodiments, the condition of the subject may be determined based on comparing one or more of the subject movement parameters with reference parameters. In some embodiments, the reference movement parameters may be historical movement parameters related to the subject, movement parameters of subjects similar to the subject, or movement parameters that are pre-determined (by a user or by one or more components of system 100). In some embodiments, the reference movement may be based on historical movement parameters. For example, on the first day, the guest was able to enter into the room in 10 seconds, whereas the lock open delay was set to 12 seconds, the same guest on second day, was able to enter into the room in 8 seconds, in this case, the control module (described below) may instruct the locking system to adjust the open delay time to 10 seconds. In some embodiments, the reference parameters may be dynamically updated as more data becomes available (e.g., new data about similar subjects, or new data from the subject).

For example, the subject condition module 120 may determine that a condition of the subject is “normal” if his moving speed, manner of moving, balance, or other movement parameters is within a condition threshold. In some embodiments, the condition threshold may be a single value, or a combination of values (e.g., each corresponding to a movement parameter). In some embodiments, the condition threshold may be a range of values of a given movement parameter or a combination of value ranges (e.g., each range corresponding to a movement parameter). In some embodiments, the subject condition module 120 may determine that a subject is “fast” or “slow” if his moving speed, manner, balance, or other movement parameters is above or below the condition threshold respectively. In some embodiments, subject condition module 120 may be configured to determine the condition threshold (of movement of the subject). In some embodiments, the condition threshold may be determined based on the subject. For example, a condition threshold for the subject may be based on historical information related to the subject. The subject historical information may be data collected previously at this location (e.g., the subject usually walks at speed X down this particular hallway to reach this particular door; in this case the condition threshold may be speed X or a speed range that includes X, etc.). In some embodiments, the subject historical information may be data collected (e.g., overtime) about the subject's movement in general (e.g., the subject, when walking, usually walks at an average speed Y, in this case the condition threshold may be speed Y or a speed range that includes Y, etc.). In some embodiments, the condition threshold may be determined based on comparison of the subject with similar subjects in a similar environment. It should be noted that these examples of determining the condition of the subject and the condition threshold are not intended to be limiting. Other methods for defining, determining, or obtaining the condition or the threshold may be used and are consistent with the disclosed embodiments. For example, a condition threshold may be pre-determined by a system administrator or may apply to all the subjects regardless of similarities.

Control module 130 is configured to determine one or more control parameters to be sent to locking system 106. In some embodiments, the one or more control parameters may include instructions to adjust the open delay time of locking system 106. In some embodiments, the one or more control parameters may be determined based on the determined movement parameters (e.g., obtained from subject condition module 120). For example, control module 130 may determine the control parameters (to be sent to the locking system) to adjust the open delay based on the moving speed, number of steps taken, pace, manner and pattern of walking (e.g., gait), balance, coordination, and/or other movement related parameters. In some embodiments, the control parameters may be determined by comparing the subject's movement parameters with the reference movement parameters. For example, control module 130 may determine that similar subjects in a similar situation (e.g., same walking manner) needed a particular amount of time to reach the door (or locking system). In this case, control module 130 may instruct locking system 106 to adjust the open delay to match that particular amount of time. Similarly, the control module 130 may look at the subject's previous movement parameters (e.g., a previous time when he was slow in the same location) to determine the control parameters to be sent to locking system 106.

In some embodiments, control module 130 may be configured to send instruction to adjust the open delay time responsive to one or more movement parameters reaching a movement threshold. The movement threshold may be determined in a similar manner as the condition threshold described herein.

In some embodiments, the one or more control parameters may be based on the condition of the subject. For example, in response to the condition of the subject being slow, the one or more control parameters may include instruction to increase the open delay time. Similarly, in response to the condition of the subject being fast, the one or more control parameters may include instruction to decrease the open delay time. In some embodiments, in case the condition of the subject is determined to be normal or fast, the control parameters may instruct the locking system not to change the open delay time. In some cases, the control module 130 does not send any instructions (related to the open delay) to the locking system if the condition of the subject is determined to be normal or fast. In some embodiments, in response to the subject condition being determined, control module 130 may look further into the movement parameters to determine the one or more control parameters (as described above).

In some embodiments, control module 130 may determine an amount of time by which the open delay time is adjusted. Control module 130 may determine the amount of time based on the movement parameters of the subject (e.g., obtained from subject condition module 120). For example, control module may estimate the extra time needed for the subject to reach the locking system based on his movement parameters. The control parameters sent to the locking system may indicate the estimated extra time needed and in response the locking system increases the open delay time by the estimated amount of time. In some embodiments, the amount of time may be determined based on comparison of one or more subject movement parameters with reference parameters (subject reference parameters or other reference parameters as described above.) Control module 130 may determine a difference between one or more movement parameters and corresponding reference parameters and instruct the locking system to increase the open delay time by the difference amount. For example, if the control module 130 determines the subject is 12 seconds slower, then it instructs the locking system to increase the open delay time by 12 seconds.

In some embodiments, control module 130 may be configured to determine an average difference between one or movement parameters and the reference parameters and determine the extra time needed based on the average difference. For example, if the average difference between the subject parameters and the reference parameters is 20%, then control module 130 may determine that the subject may need 20% more time to reach the locking system. In some embodiments, control module 130 may send instructions to adjust the open delay time by more than the average difference to make sure that the subject will reach the locking system before its locked again (e.g., 25% more time in the case where the difference is 20%). In some embodiments, the amount of time by which the open delay time is adjusted may be pre-determined (e.g., by a user, or system 100). For example, responsive to a determination that the subject is slow, the control module 130 instructs the locking system to increase the open delay time by a pre-determined amount of time. The pre-determined amount of time may be a percentage of the open delay time (e.g., the instruction may be: increase open delay time by 50%), a fixed amount of time (e.g., increase by 20 seconds), or other pre-determined amount of time.

In some embodiments, locking system 106 may control access to a controlled space (e.g., a room). Control module 130 may be configured to, subsequent to the subject accessing the controlled space, send a subsequent instruction to locking system 106 to adjust the open delay time back to an original open delay time (e.g., default open delay time). In some embodiments, in case of multiple subjects having access to the controlled space, the adjusted open delay time applies to all the subjects. In some embodiments, subject condition module 120 may be configured to determine one or more movement parameters of the multiple subjects (e.g., based on the output signals from the one or more sensors). Control module 130 may be configured to send an instruction to the locking system to adjust the open delay time for the locking system based on the determined movement parameters of a slowest of the multiple subjects.

In some embodiments, control parameter 130 may be configured to send instructions to locking system 106 to delay opening of the door (instead of instructing the locking system to stay open). For example, based on the movement parameters or responsive to a determination that the subject is slow, control parameter 130 may instruct lock system to delay opening the lock by an amount of time to allow the subject to reach the locking system (or door). The amount of time by which the opening of the locking system is delayed may be determined in the same manner described above. This may enhance security of the controlled area and decrease the possibility of someone else gaining access to the controlled area before the subject reaches the door.

Figure 2:
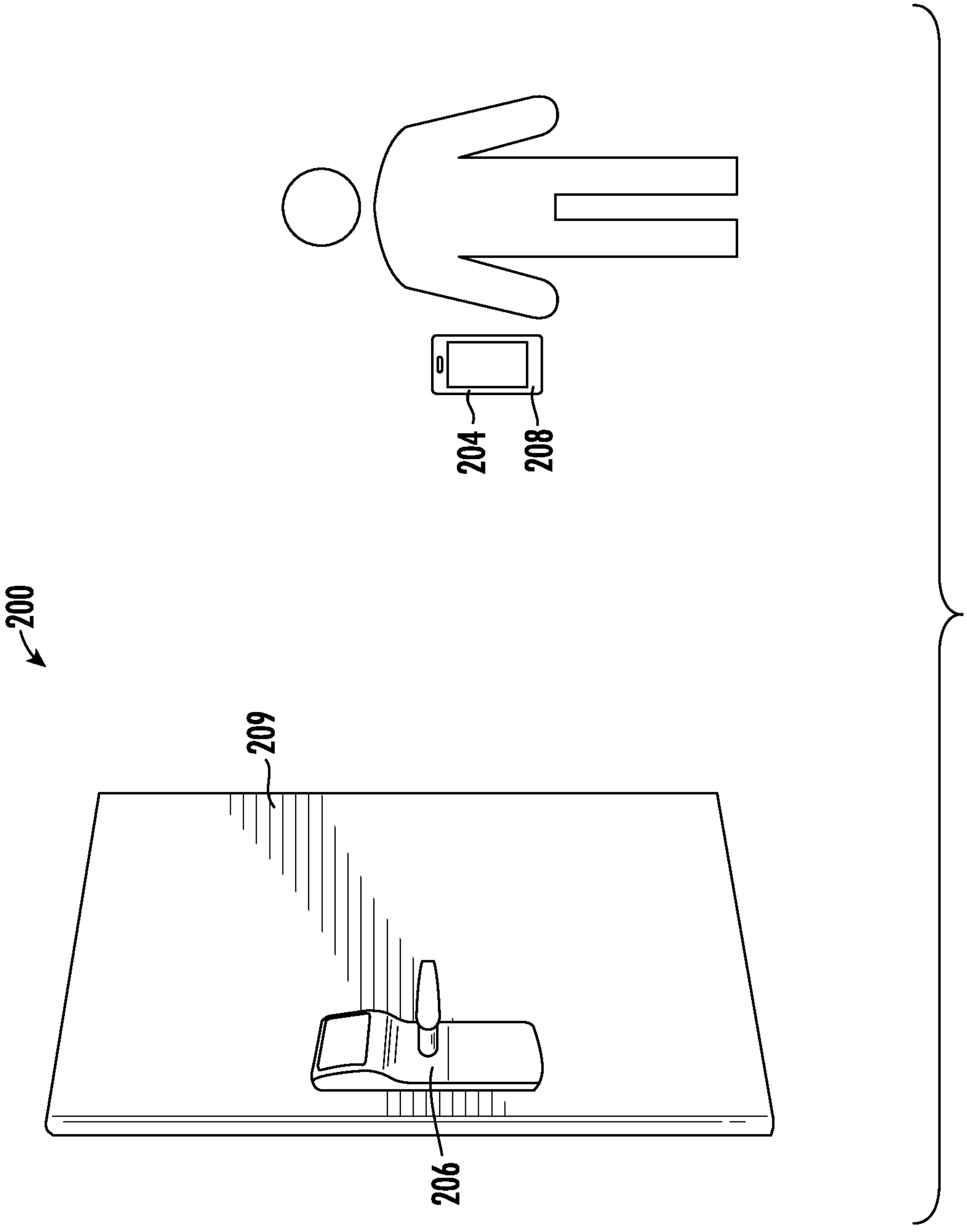
FIG. 2 shows an example of operations of a system for control of a locking system, in accordance with one or more embodiments.

FIG. 2 shows an example 200 of operations of system 100 according to one or more embodiments. In this example user device 204 is a mobile device (e.g., mobile phone, wearable computing device, tablet, etc.) User device 204 may include one or more sensors 208. For example, one or more sensors 208 may include an accelerometer, a pedometer, a location sensor, and/or other sensors. Sensors 208 may be configured to generate output signals indicating movement information of the subject. In some embodiments, user device 204 may be configured to determine movement parameters of the subject based on the output signals from sensors 208. For example, user device may determine that the subject is moving slowly (or subject condition slow). User device 204 may be configured to communicate with locking system 206 that controls access to door 209. For example, responsive to the user device 204 being in proximity of locking system 206, a short-range communication may be established between the user device and the locking system to allow for authentication. The short-range communication may be BLUETOOTH™, BLUETOOTH LE™ (BLE), Wi-Fi, near field communications (NFC), RFID, UWB, or other short-range communications technologies. In some embodiments, user device 204 may be configured (e.g., through a mobile app or web application) to wirelessly send authentication information to open locking system 206. Responsive to the determination that the subject is moving slowly, user device 204 may send an instruction to locking system 206 to increase the open delay time to allow the subject to reach the door and access the controlled area (e.g., room) comfortably without having to authenticate to unlock the locking system again. In some embodiments, the instruction to adjust the open delay time may be sent at same time as the authentication, or after the authentication and after the door is unlocked.

Figure 3:
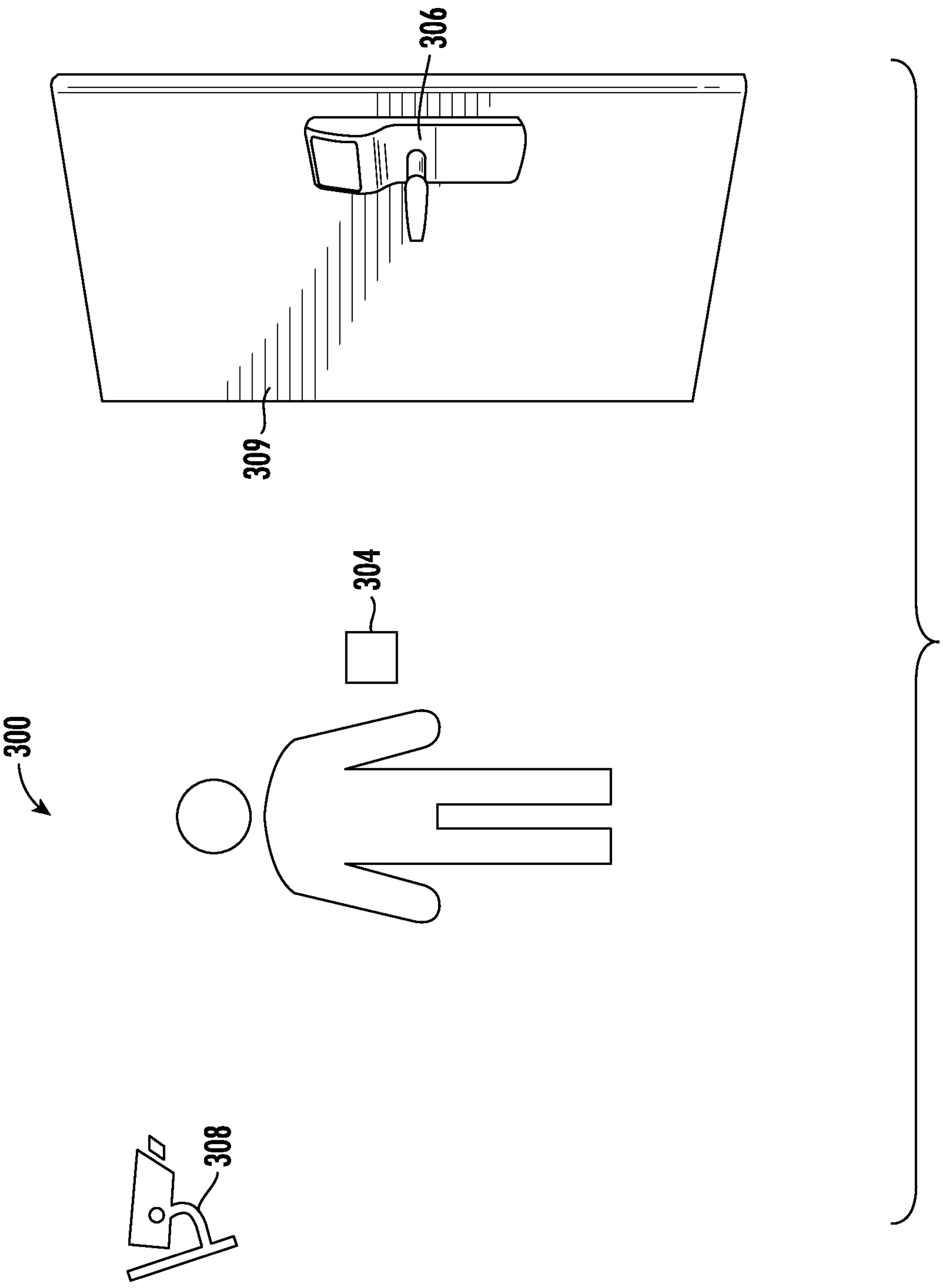
FIG. 3 shows an example of operations of a system for control of a locking system, in accordance with one or more embodiments.

FIG. 3 shows an example 300 of operations of system 100 according to one or more embodiments. In this example, user device 304 is a keycard (e.g., contact, or contactless keycard) configured to communicate with locking system 306 that controls access to door 309. Sensors 308 may include one or more optical sensors (e.g., camera, movement sensors, or other optical sensors). In some embodiments, the optical sensors may be configured to generate output signals indicating movement information of the subject. In some embodiments, the sensors 308 may be configured to determine subject movement parameters (e.g., gait, speed, balance, etc.) based on the output signals using image/video analysis. Sensors 308 may be configured to send instructions to locking system 306 to adjust the open delay time based on the determined movement parameters. For example, in some embodiments, sensors 308 may communicate with the locking system directly using BLUETOOTH LE™ (BLE), or indirectly using a series BLE repeaters. In some embodiments, sensors 308 may communicate with the keycard (in the case where the key card is a smart card) and the key card sends the instruction to adjust the open delay time to locking system 306. In other examples, sensors 308 may communicate with a control server, and the control server sends the instructions to adjust to locking system 306.

Returning to FIG. 1, in some embodiments system 100 may include a network 190 connecting one or more components of system 100. In some embodiments, network 190 may be a dedicated communication link. In some embodiments, network 190 may be any type of network configured to provide communications between components of system 100. For example, network 190 may be any type of wired or wireless network (including infrastructure and any type of computer networking arrangement used to exchange data) that provides communications, exchanges information, and/or facilitates the exchange of information, such as the Internet, a private data network, a virtual private network using a public network, a Wi-Fi network, a LAN or WAN network, A frequency (RF) link, BLUETOOTH™, BLUETOOTH LE™ (BLE), Ultra-wideband (UWB), near field communication (NFC), optical code scanner, cellular network, Universal Serial Bus (USB), text messaging systems (e.g., SMS, MMS) or other suitable connections that enables the sending and receiving of information between the components of system 100.

It should be appreciated that the illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium.

Figure 4:
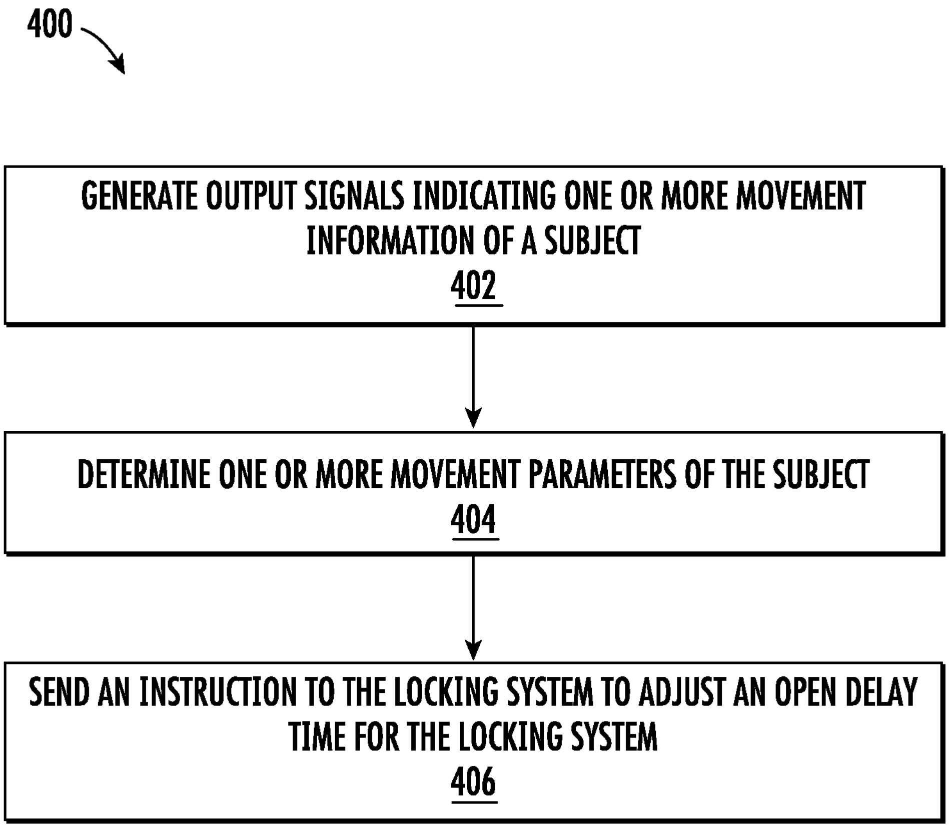
FIG. 4 shows a chart of a method for control of a locking system, in accordance with one or more embodiments.

FIG. 4 Illustrates a method 400 for control of a locking system, in accordance with one or more embodiments of the present disclosure. The operations of method 400 presented below are intended to be illustrative. In some implementations, method 400 may be accomplished with one or more additional operations not described and/or without one or more of the operations discussed. Additionally, the order in which the operations of method 400 are illustrated in FIG. 4 and described below is not intended to be limiting In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

At an operation 402 of method 400, output signals indicating one or more movement information of a subject may be generated. In some embodiments, operation 402 may be performed by one or more sensors, the same as or similar to sensors 108 (shown in FIG. 1 and described herein).

At an operation 404 of method 400, one or more movement parameters of the subject may be determined. In some embodiments, operation 404 may be performed by a module, the same as or similar to subject condition module 120 (shown in FIG. 1 and described herein).

At an operation 406 of method 400, an instruction to adjust an open delay time for a locking system may be sent to the locking system. In some embodiments, the instruction may be based on the determined movement parameters of the subject. In some embodiments, operation 406 may be performed by a control module, the same as or similar to control module 130 (shown in FIG. 1 and described herein).

Figure 5:
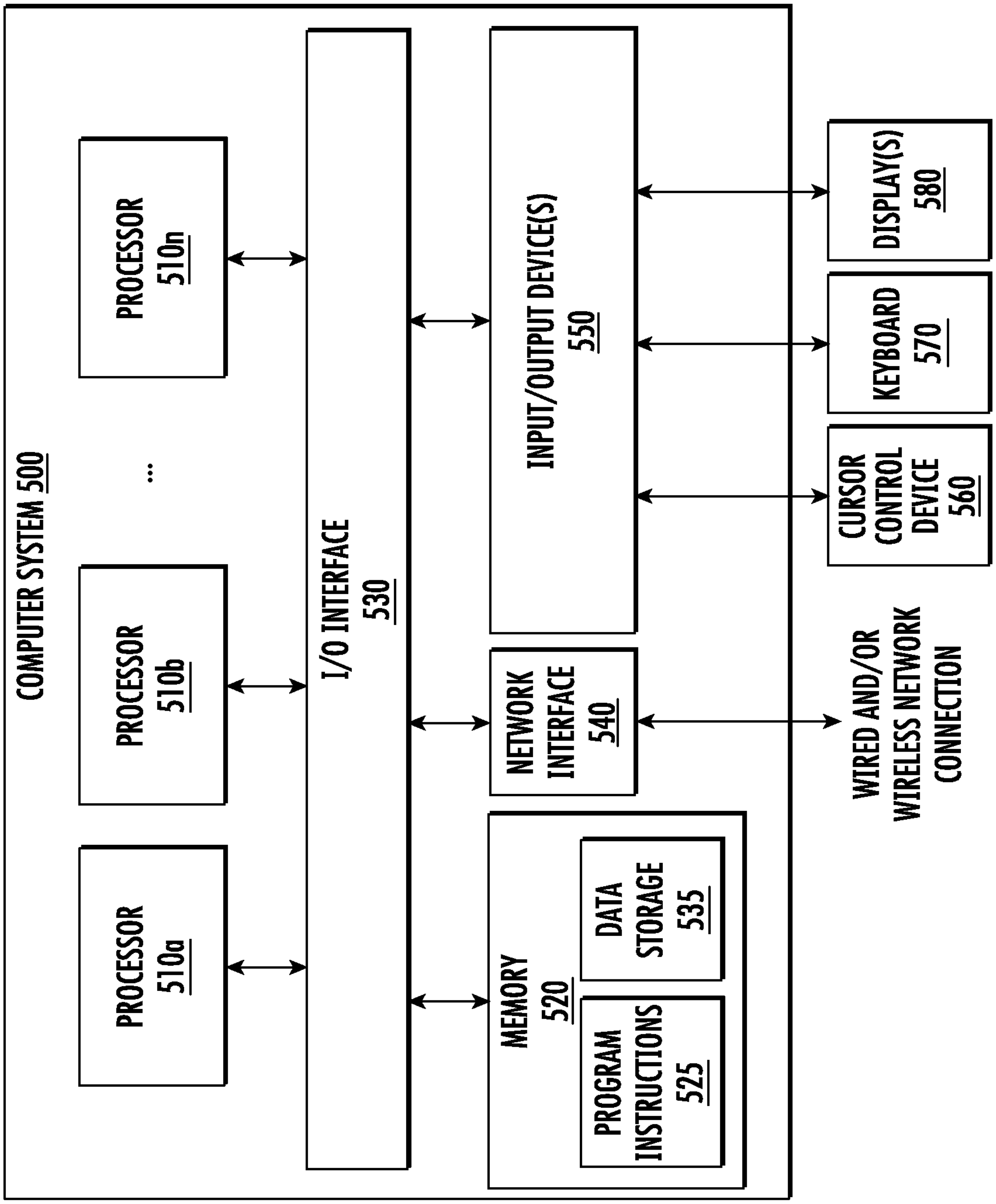
FIG. 5 shows an example of a computer system that may be used to implement aspects of the techniques described herein.

Embodiments of one or more techniques of for control of a locking system as described herein may be executed on one or more computer systems, which may interact with various other devices. One such computer system is illustrated by FIG. 5. FIG. 5 shows an example of a computer system that may be used to implement aspects of the techniques described herein. In different embodiments, computer system 500 may include any combination of hardware or software that can perform the indicated functions, including, but not limited to, a computer, personal computer system, desktop computer, laptop, notebook, tablet, or netbook computer, mainframe computer system, handheld computer, a wearable computing device, workstation, network computer, a camera, a set top box, a mobile device, network device, internet appliance, PDA, wireless phones, pagers, a consumer device, video game console, handheld video game device, application server, storage device, a peripheral device such as a switch, modem, router, or other type of computing or electronic device.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In some embodiments, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. may be comprised of semiconductor(s) and/or transistors (e.g., electronic integrated circuits (ICs)). In such a context, processor-executable instructions may be electronically executable instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

In some embodiments, at least one processor 510 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others. In some embodiments, one or more computers may include multiple processors operating in parallel. A processor may be a central processing unit (CPU) or a special-purpose computing device, such as graphical processing unit (GPU), an integrated circuit or on-chip system, an application-specific integrated circuit (ASIC), a field-programmable gate array (FPGA), a complex programmable logic device (CPLD), or application-specific integrated circuits.

System memory 520 may be configured to store program instructions and/or data accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described in this disclosure, are shown stored within system memory 520 as program instructions 525 and data storage 535, respectively. In other embodiments, program instructions and/or data may be received, sent or stored upon different types of computer-accessible media or on similar media separate from system memory 520 or computer system 500. Generally speaking, a computer-accessible medium may include storage media or memory media such as magnetic or optical media, e.g., disk or CD/DVD-ROM coupled to computer system 500 via I/O interface 530. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 540.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments some or all of the functionality of I/O interface 530, such as an interface to system memory 520, may be incorporated directly into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example, via telecommunications/telephony networks such as analog voice networks or digital fiber communications networks;

via storage area networks such as Fibre Channel SANs, or via any other suitable type of network and/or protocol.

Input/output devices 550 may, in some embodiments, include one or more display terminals, cursor control devices (e.g., mouse), keyboards, keypads, touchpads, touchscreens, scanning devices, voice or optical recognition devices, or any other devices suitable for entering or retrieving data by one or more computer system 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

Those skilled in the art will appreciate that computer system 500 is merely illustrative and is not intended to limit the scope of the present disclosure. In particular, computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. For example, it is to be understood that the present disclosure contemplates that, to the extent possible, one or more features of any embodiment can be combined with one or more features of any other embodiment. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A control system for control of a locking system, the control system comprising:

one or more sensors configured to generate output signals indicating one or more movement information of a subject;

at least one processor operatively connected with the one or more sensors; and memory storing instructions executable by the at least one processor, wherein:

the control system is configured for use with a locking system using an open delay time to determine how long a lock of the locking system remains open once unlocked;

the instructions when executed cause the control system to:

determine, using the output signals from the one or more sensors, one or more movement parameters of the subject; and send, based on the determined movement parameters of the subject, an instruction to the locking system to adjust the open delay time for the locking system.

2. The control system of claim 1, wherein the one or more movement parameters comprise speed of the subject.

3. The control system of claim 1, wherein the instructions when executed cause the system to:

determine a condition of the subject based on the one or more movement parameters reaching a condition threshold; and send the instruction to the locking system based on the determined condition of the subject.

4. The control system of claim 1, wherein the one or more sensors comprise an optical sensor, and wherein the instructions when executed cause the system to:

determine a gait of the subject based on the output signals of the optical sensor such that gait of the subject is one of the one or more movement parameters; and send the instruction to the locking system based on the determined gait.

5. The control system of claim 4, wherein the optical sensor is configured to send the instruction to the locking system.

6. The control system of claim 4, wherein the optical sensor is configured to communicate with the locking system using one or more short-range repeaters.

7. The control system of claim 1, further comprising:

a user device configured to communicate authentication information with the locking system.

8. The control system of claim 1, wherein the locking system controls access to a controlled space, and wherein the instructions when executed cause the system to:

send a subsequent instruction to the locking system, subsequent to the subject accessing the controlled space, to adjust the open delay time back to an original open delay time.

9. The control system of claim 1, wherein the locking system controls access to a controlled space, and wherein the adjusted open delay time for the locking system is applied to additional subjects having access to the controlled space.

10. The control system of claim 1, wherein the locking system controls access to a controlled space, and wherein additional subjects have access to the controlled space, and wherein the instructions when executed cause the system to:

determine, using the output signals from the one or more sensors, one or more movement parameters of the additional subjects; and send the instruction to the locking system to adjust the open delay time for the locking system based on the determined movement parameters of a slowest of the subject and the additional subjects.

11. A method for control of a locking system, the method being implemented in a control system comprising one or more sensors, at least one processor and memory storing instructions, the locking system using an open delay time to determine how long a lock of the locking system remains open once unlocked, the method comprising:

generating output signals indicating one or more movement information of a subject;

determining, using the output signals from the one or more sensors, one or more movement parameters of the subject; and sending, based on the determined movement parameters of the subject, an instruction to the locking system to adjust the open delay time.

12. The method of claim 11, wherein the one or more movement parameters comprise speed of the subject.

13. The method of claim 11, further comprising:

determining a condition of the subject based on the one or more movement parameters responsive to the one or more parameters reaching a condition threshold; and sending the instruction to the locking system based on the condition on the subject.

14. The method of claim 11, wherein the one or more sensors comprise an optical sensor, and wherein the method further comprises:

determining a gait of the subject based on the output signals of the optical sensor; and sending the instruction to the locking system based on the determined gait.

15. The method of claim 14, further comprising:

sending the instruction to the locking system using the optical sensor.

16. The method of claim 14, further comprising:

communicating with the locking system using the optical sensor and one or more short-range repeaters.

17. The method of claim 11, further comprising:

communicating authentication information with the locking system using a user device.

* * * * *